(12) United States Patent
Valency et al.

(10) Patent No.: US 9,411,908 B2
(45) Date of Patent: Aug. 9, 2016

(54) ARCHITECTURE FOR TCAM SHARING

(71) Applicant: Marvell Israel (M.I.S.L) Ltd., Yokneam (IL)

(72) Inventors: Lior Valency, Tel-Aviv (IL); Aron Wohlgemuth, Givat Shmuel (IL); Gil Levy, Hod Hasharon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 178 days.

(21) Appl. No.: 14/168,808

(22) Filed: Jan. 30, 2014

(65) Prior Publication Data

US 2014/0215144 A1 Jul. 31, 2014

Related U.S. Application Data

(60) Provisional application No. 61/758,497, filed on Jan. 30, 2013.

(51) Int. Cl.
*G06F 12/00* (2006.01)
*G06F 17/30* (2006.01)
*H04L 12/861* (2013.01)

(52) U.S. Cl.
CPC .......... *G06F 17/30982* (2013.01); *H04L 49/90* (2013.01)

(58) Field of Classification Search
CPC .......................... G06F 17/30982; H04L 49/90
See application file for complete search history.

(56) References Cited

U.S. PATENT DOCUMENTS

| | | | |
|---|---|---|---|
| 7,245,623 B1 * | 7/2007 | Cheriton | H04L 49/90 370/393 |
| 8,990,492 B1 * | 3/2015 | Zhou | G06F 17/00 711/105 |
| 2004/0015583 A1 * | 1/2004 | Barrett | H04L 12/2602 709/224 |

* cited by examiner

*Primary Examiner* — Kalpit Parikh

(57) ABSTRACT

Aspects of the disclosure provide a packet processing system. The packet processing system includes a plurality of processing units, a ternary content addressable memory (TCAM) engine, and an interface. The plurality of processing units is configured to process packets received from a computer network, and to perform an action on a received packet. The action is determined responsively to a lookup in a table of rules to determine a rule to be applied to the received packet. The TCAM engine has a plurality of TCAM banks defining respective subsets of a TCAM memory space to store the rules. The interface is configured to selectably associate the TCAM banks to the processing units. The association is configurable to allocate the subsets of the TCAM memory space to groups of the processing units to share the TCAM memory space by the processing units.

18 Claims, 4 Drawing Sheets

ARCHITECTURE FOR TCAM SHARING

INCORPORATION BY REFERENCE

This present disclosure claims the benefit of U.S. Provisional Application No. 61/758,497, "Architecture for TCAM Sharing" filed on Jan. 30, 2013, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, content addressable memory (CAM) is used in various applications to provide a comparatively fast exact match searching capability. In an example, a network device, such as a network switch, a router and the like includes a ternary CAM (TCAM) to store criteria for a plurality of switching rules for various functionalities, such as packet parsing, quality of service assignment, security, forwarding, filtering, and the like. In an example, a criterion includes a requirement, such as a range requirement, exact match requirements, and the like, that occupies one or more TCAM entries, and addresses of the TCAM entries point to action codes associated with the criterion. When the network device receives a packet, attributes of the packet are extracted to form a search key. The search key is compared with plural TCAM entries, typically comparison of the search key against the plural TCAM entries is performed in parallel in a single clock cycle, to find a matching entry from among the TCAM entries in a single search operation. The address of the matching entry points to an action code. According to the action code, the network device takes specified actions on the packet.

SUMMARY

Aspects of the disclosure provide a packet processing system. The packet processing system includes a plurality of processing units, a ternary content addressable memory (TCAM) engine, and an interface. The plurality of processing units is configured to process packets received from a computer network, and to perform an action on a received packet. The action is determined responsively to a lookup in a table of rules to determine a rule to be applied to the received packet. The TCAM engine has a plurality of TCAM banks defining respective subsets of a TCAM memory space to store the rules. The interface is configured to selectably associate the TCAM banks to the processing units. The association is configurable to allocate the subsets of the TCAM memory space to groups of the processing units to share the TCAM memory space by the processing units.

In an embodiment, the network device includes a controller configured to receive indications of memory space requirements of the processing units and configure the interface to allocate the subsets of the TCAM memory to the groups of the processing units based on the indications. In an example, the controller is configured to control the configurable interface to associate the TCAM banks with active processing units in an application. For example, the controller is configured to receive activity information of the processing units that are indicative of the memory space requirement, and control the interface to allocate the subsets of the memory space to the groups of the processing units according to the activity information.

In an example, the interface is configured to associate two or more processing units into a processing group, and to allocate a same subset of TCAM banks to the processing group to perform lookup among rules that are commonly applicable to the two or more processing units. Further, in an example, the interface is configured to associate another processing unit into another processing group, and allocate another subset of TCAM banks to the other processing group when the other processing unit applies different rules from the two or more processing units.

According to an aspect of the disclosure, entries of two or more TCAM banks are coupled to form a TCAM bank group based on a search key size requirement and the TCAM bank group is configured to output an index of a coupled entry when a search key matches the coupled entry. Further, the interface is configured to associate one or more TCAM bank groups to a processing group of processing units based on a number of rule entries requirement of the processing group. In an example, the interface is configured to select an output from one of the TCAM bank groups based on a priority order of the TCAM bank groups when the TCAM bank groups are associated to a single result. In another example, the interface is configured to output respective outputs of the TCAM bank groups when the TCAM bank groups are associated to different results.

Aspects of the disclosure provide a method for packet processing in a packet processing system that has a plurality of processing units. The method includes parsing, by a processing unit, a received packet to generate a search key, and providing the search key to a ternary content addressable memory (TCAM) engine via an interface. The TCAM engine includes a plurality of TCAM banks defining respective subsets of a TCAM memory space to store rules and the interface selectably associates the TCAM banks to the processing units. The association is configurable to allocate the subsets of the TCAM memory space to groups of the processing units to share the TCAM memory space by the processing units. Further, the method includes performing an action on the received packet based on a search result from the TCAM engine.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
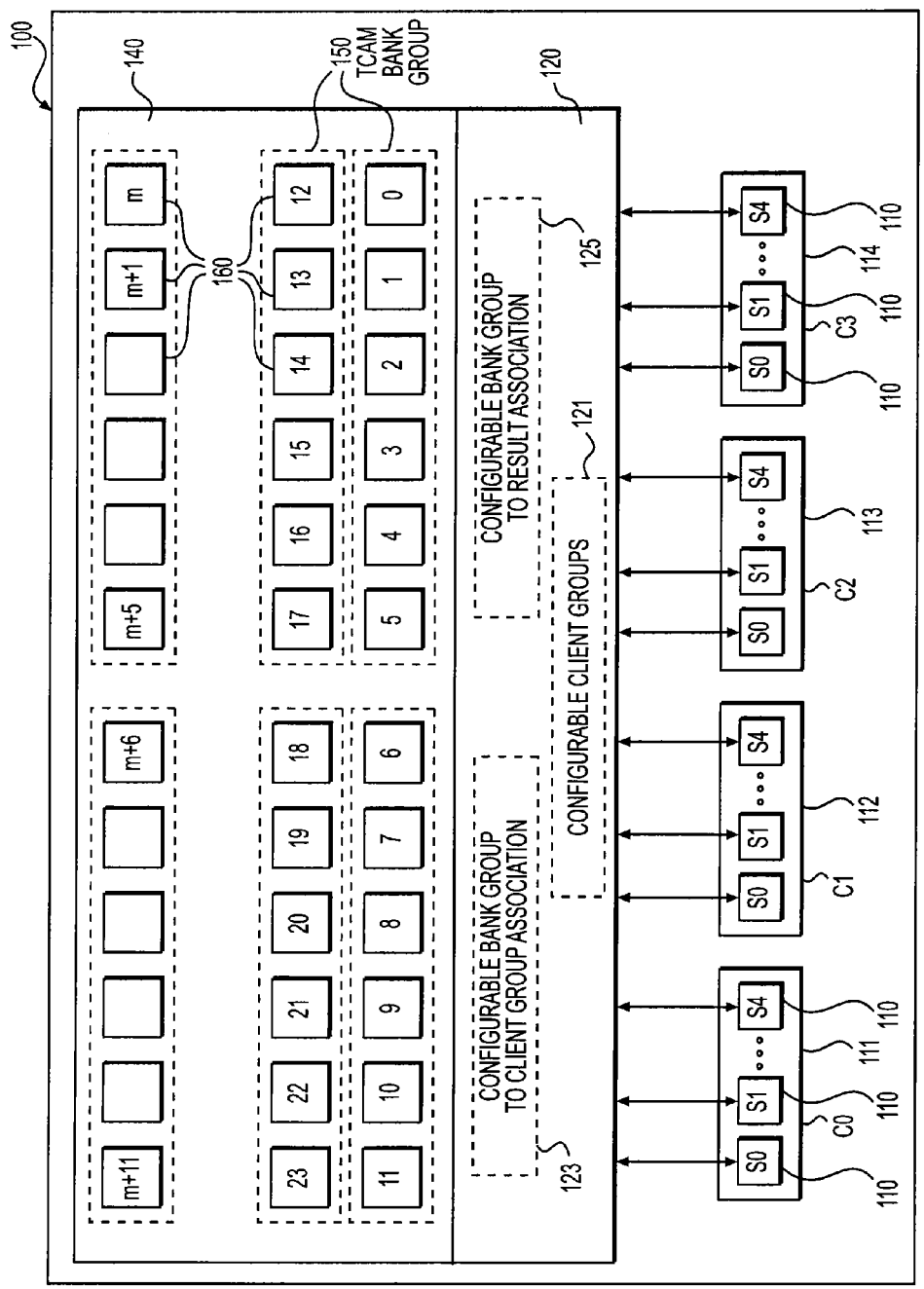
FIG. 1 shows a block diagram of an electronic device example 100 with an architecture for ternary content addressable memory (TCAM) sharing according to an embodiment of the disclosure.

FIG. 1 shows a block diagram of an electronic device example 100 with an architecture for ternary content addressable memory (TCAM) sharing according to an embodiment of the disclosure. The electronic device 100 includes a TCAM engine 140 having a plurality of TCAM banks 160, a plurality of search clients 110, and a configurable interface 120. The interface 120 configurably associates the TCAM banks 160, such as TCAM bank groups 150, and the like to the search clients 110, such that the TCAM engine 140 is flexibly shared by the search clients 110 based on search service requirements of the search clients 110. In an embodiment, these elements are suitably coupled together as shown in FIG. 1.

The electronic device 100 can be any suitable device that uses TCAM to match a search key to stored data patterns. In the FIG. 1 example, the electronic device 100 is a network device 100, such as a network switch, a router, and the like. The network device 100 includes one or more packet processors (cores), such as packet processors 111-114, configured to process packets, in an embodiment. The packet processors can be respectively implemented using any suitable architecture, such as an architecture of application specific integrated circuit (ASIC) pipeline processing engines, an architecture of programmable processing engines, an architecture of multiplicity of run-to-completion processors, and the like. For example, the network device 100 receives a packet transmitted in a network (not shown) via an ingress port, and one of the packet processors 111-114 processes the packet, and determines actions on the packet, such as forwarding the packet to one or more egress ports to output the packet, dropping the packet, and the like. In another example, the network device 100 receives two or more packets, and two or more packet processors 111-114 respectively process the packets at the same time, and determine respective actions on the packets.

According to an aspect of the disclosure, actions on packets are determined based rules. In an embodiment, a rule includes criteria and an action code associated with the criteria. The criteria specify data patterns for attributes. A switching rule might be expressed in plain English as "permit forwarding a packet with source address 172.15.5.0/24, TCP port number between 1 to 14", for example. In the preceding example, the switching rule includes a source address criterion, a protocol (TCP) criterion, a TCP port number criterion, and an action code "permit forwarding" in association with the criteria. When a received packet satisfies the criteria, an action according to the action code can be taken on the received packet.

In the FIG. 1 example, each packet processor includes a plurality of processing units, such as S0-S4 for each of the packet processors 111-114, and the like, that require search service from the TCAM engine 140. The processing units S0-S4 in the packet processor 111-114 are referred to as search clients of the TCAM engine 140.

In an example, a packet includes a header of 128 bytes. The packet processing units S0-S4 respectively parse a portion of the header to form a search key. The search keys are provided to the TCAM engine 140. Then, the TCAM engine 140 respectively looks up the search keys to determine rules with criteria being satisfied by the search keys. Then, the search results direct to action codes for actions to be applied to the packet.

According to an aspect of the disclosure, criteria are stored in the TCAM engine 140, and the action codes are stored separately from the criteria. In an embodiment, the criteria are stored in the TCAM engine 140 as entries that are indexed and the action codes are stored in a memory (not shown), such as static random access memory (SRAM) and the like, at addresses that are pointed by indexes of the entries. In an example, the index of an entry points to an address in the memory that stores an action code associated with the criteria.

The search clients 110 have same or different search service requirements. In an example, the number of rule entries for the search client S0 is relatively large, such as larger than 512 entries for example, and the number of rule entries for the search client S1 is relatively small, such less than 256 entries for example. In another example, the rules for the search clients S0s in the packet processors 111-114 are the same across the packet processors 111-114. In another example, in a specific application, the packet processor 113 is disabled and thus the search clients S0-S4 in the packet processor 113 do not require any search service.

According to an aspect of the disclosure, each TCAM bank 160 is configured to be able to perform a search operation. A plurality of TCAM banks 160 forms a TCAM bank group 150. The interface 120 is configured to enable the TCAM bank group 150 to be individually allocable to search clients.

Specifically, in an example, each TCAM bank 160 includes an array of TCAM cells to store data patterns, and auxiliary circuits, such as an input circuit to receive a search key for comparison with the data patterns stored in the TCAM bank, and the like. Thus, each TCAM bank 160 is individually operable. In an example, each TCAM bank 160 includes a 256 by 84 matrix that has 256 rows, and 84 columns of TCAM cells. Each row is a TCAM entry. In an example, in each row, 80 bits are used for the data pattern, and 4 bits are used for defining search key size. Thus, each TCAM bank 160 is suitable for up to 10 bytes of search key size, and up to 256 rule entries.

According to an aspect of the disclosure, TCAM banks in a row form a floor. Multiple TCAM banks on the same floor can be coupled together to form a TCAM bank group 150 to support a large range of key sizes. In the FIG. 1 example, each TCAM bank group 150 includes six TCAM banks, and supports all key sizes of 80 bits to 480 bits. It is noted that the TCAM engine 140 can be implemented to have any suitable number of TCAM banks in each TCAM bank group 150. In another example, each TCAM bank group 150 includes eight TCAM banks, and supports all key sizes of 80 bits to 640 bits. A TCAM bank group 150 can be associated to a search service that requires a key size in the supported range. Further, multiple TCAM bank groups 150 on the different floors can be associated to a same search service that requires a relatively large number of rule entries for the search service.

Specifically, in the FIG. 1 example, six neighboring TCAM banks on the same floor are coupled together to form a TCAM bank group 150 and the TCAM banks in the TCAM bank group 150 are associated with a same search service. For example, corresponding entries in a same entry row of the six TCAM banks are suitably coupled to form a coupled entry. It is noted that each coupled entry supports many combination of rule criteria combinations, such as a first combination of up to six short criteria that each occupies 80 bits, a second combination of up to three criteria that each occupies 160 bits, a third combination of a criterion having 480 bits, a fourth combination of four criteria that each occupies 80 bits and another criterion of 160 bits, and the like in the FIG. 1 example. Further, in an example, a priority decoder is suitably coupled with the TCAM bank group to output an index of a coupled entry having the highest priority among coupled entries that match a search key. Thus, the search key size for the TCAM bank group is up to 60 bytes for example. It is noted that the TCAM engine 140 can be suitably modified to have other suitable number of TCAM banks on each floor, and the TCAM engine 140 can be suitably modified to have other suitable number of TCAM banks coupled together in each TCAM bank group.

In another embodiment, when two TCAM bank groups 150 of different floors are associated with a same search service to generate a result, the priority decoders of the two TCAM bank groups are coupled together following a priority order. In an example, the TCAM bank group 150 on the lower floor has higher priority order. In another example, the TCAM bank group 150 on the higher floor has higher priority order. In an embodiment, during a search operation, the two TCAM bank groups 150 respectively perform a search in response to the same search key, the priority decoders of the two TCAM bank groups 150 respectively output indexes of the matching entries in the TCAM bank groups 150, and the index with the higher priority order is output as an aggregated result of the two TCAM bank groups 150. Thus, the number of rule entries for the two TCAM bank groups 150 is up to 512 for example.

According to an aspect of the disclosure, the interface 120 is configured to associate the TCAM bank groups 150 to the search clients 110. In the FIG. 1 example, the interface 512 includes a first configuration 121 for grouping clients and a second configuration 123 for associating bank groups to client groups.

In an embodiment, by the first configuration 121, the search clients 110 are grouped according to a rule commonality of respective search service requirements. The search clients 110 in the same client group apply the same rules and share a same subset of TCAM bank groups 150. It is noted that, in an example, each search client is associated with one client group only.

Further, in an embodiment, by the second configuration 123, the TCAM bank groups 150 are associated with the client groups. In an example, each TCAM bank group 150 is associated with one client group only, and multiple TCAM bank groups 150 can be associated with a same client group.

According to an aspect of the disclosure, the interface 120 is software configurable. In an example, the first configuration 121 is stored as a first table that associates clients into client groups, and the second configuration 123 is stored as a second table that associates TCAM bank groups to client groups. The interface 120 is configured according to the first table and the second table. The first table and the second table can be modified by a configuration controller (not shown). In an example, the network device 100 includes a central processing unit (CPU) (not shown), the CPU executes software instructions to perform the functions of the configuration controller. In another example, an external controller is coupled to the network device 100 to configure the interface 120.

According to an aspect of the disclosure, the TCAM engine 140 is flexibly shared by the multiple search clients 110 based on the search requirements of the search clients 110.

In an example, the same global rules are used in the processing units S0 of the packet processors 111-114. The interface 120 associates the processing units S0 of the packet processors 111-114 in a same client group by the first configuration 121 and associates one or more TCAM bank groups to the client group by the second configuration 123. The one or more TCAM bank groups are used to store the global rules. Thus, the global rules are not duplicatively stored for separate processors, and the TCAM memory space is saved.

In another example, a processing unit, such as the processing unit S1 of the packet processor 112, applies different rules from other processing units. The interface 120 associates the processing unit S1 of the packet processor 112 in a client group by the first configuration 121 and associates one or more TCAM bank groups to the client group by the second configuration 123. The one or more TCAM bank groups are used to store the rules only for the processing unit S1 of the packet processor 112.

In another example, for a specific application, when a processing unit, such as the processing stage S4 in the packet processor 114, is not in usage, the interface 120 is configured not to allocate any TCAM bank group to the processing unit, and the TCAM space is saved.

In an embodiment, usage information of the processing units and the service requirement information of the processing units are determined based on an application for the network device 100, and then the interface 120 is configured based on the usage information and service requirement information in a configuration mode before the network device 100 enters a normal operation mode.

In another embodiment, the usage information and the service requirement information of the processing units are detected during the normal operation of the network device 100, and then the interface 120 is configured or reconfigured based on the usage information and the service requirement information on the fly.

According to another aspect of the disclosure, the interface 120 includes a third configuration 125 for TCAM bank group to result association. In an embodiment, the third configuration 125 can be used in a multiple-field search to enlarge TCAM capacity. In an example, a search service includes rules that perform different actions based on value permutations in a first field and a second field. In an example, each of the first field and the second field has three values, and a total of nine different actions are respectively associated with nine value permutations of the first field and the second field. In an embodiment, two TCAM bank groups are allocated for the search service. The first TCAM bank group stores rule entries for the first field and is associated to a first result by the third configuration 125, and the second TCAM bank group stores rule entries for the second field and is associated to a second result by the third configuration 125. Thus, a total of six entries are used in the TCAM engine 140 instead of nine entries needed for all nine permutations. Further, in a low cost memory (not shown), such as SRAM, nine action codes are respectively associated with permutations of the first result and the second result, for example. Thus, the TCAM memory space, which is more expensive than the low cost memory, can be saved.

In another embodiment, the third configuration 125 is used to support multiple parallel lookups per lookup stage (e.g., during a lookup duration). In an example, four TCAM bank groups are allocated for a search service. The four TCAM bank groups respectively store different rule entries for a search service, and the four TCAM bank groups are respectively associated to four results. In each TCAM bank group, a portion of all the entries are masked, for example, by storing mask bits that each matches both "1" and "0". The four TCAM bank groups have different masked portions. Thus, during a lookup duration, when a search key is provided to the TCAM engine 140, the four TCAM bank groups respectively perform lookup based on different portions of the search key (e.g., corresponding to unmasked portions of the TCAM bank groups), and generate the four results. Thus, four lookups are performed in parallel.

Figure 2:
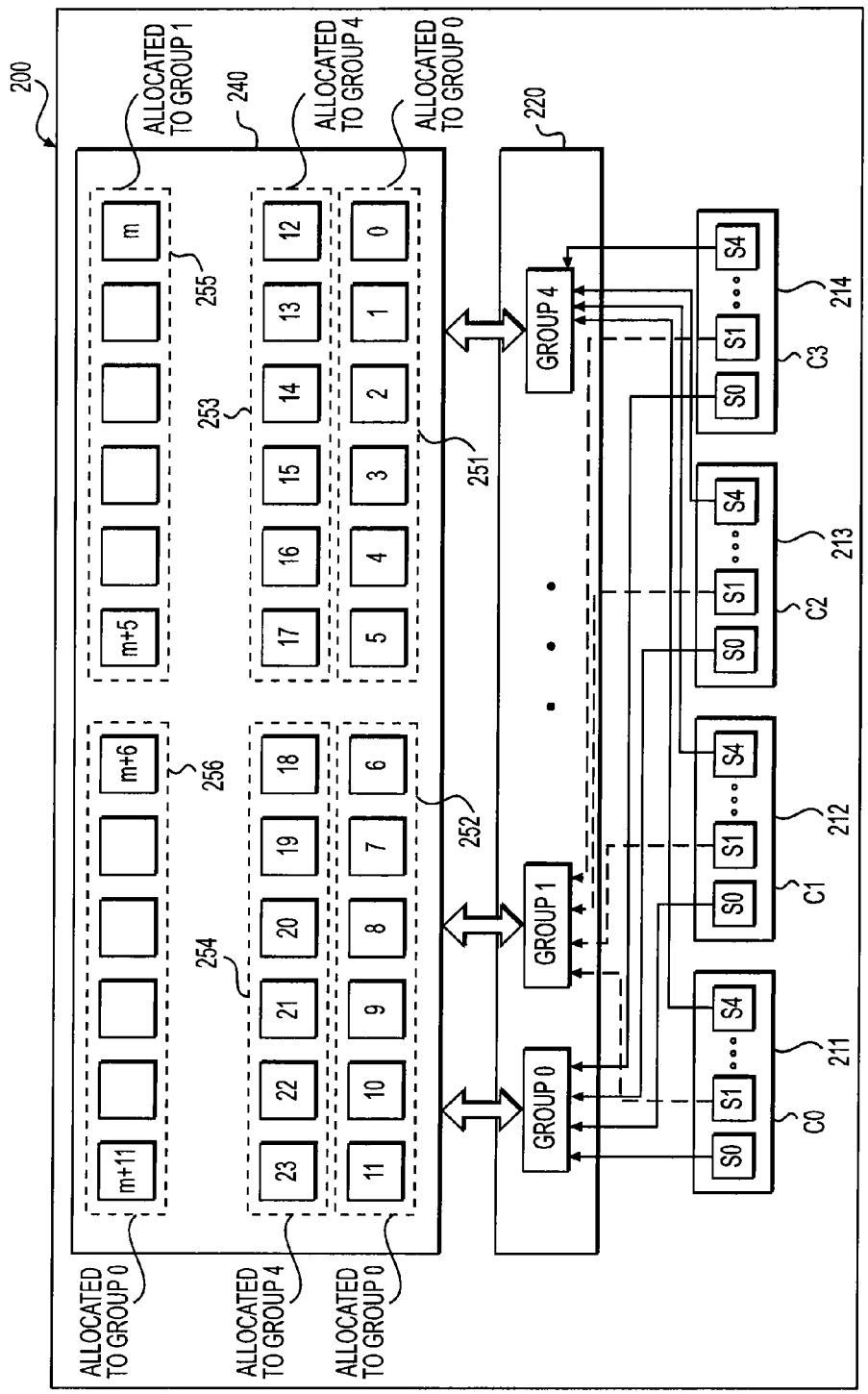
FIG. 2 shows a block diagram of an electronic device example 200 with a TCAM sharing configuration according to an embodiment of the disclosure.

FIG. 2 shows a block diagram of an electronic device 200 with a TCAM sharing configuration according to an embodiment of the disclosure. Components in the electronic device 200 are identical or equivalent to those used in the electronic device 100; the description of these components has been provided above and will be omitted here for clarity purposes.

Specifically, in the FIG. 2 example, the interface 220 is configured to form a plurality of client groups, such as a first client group GROUP0, a second client group GROUP1, a third client group GROUP4, and the like. In an example, a first set of global rules, such as a filtering rule that might be expressed in plain English as "avoiding packets with a specific value in the destination address field", and the like, are used in the processing units S0 of the packet processors 211-214. All of the processing units S0 of the packet processors 211-214 preform lookup on the destination address of the received packets. The interface 220 is configured to group the processing units S0 of the packet processors 211-214 into the first client group GROUP0. In the FIG. 2 example, a second set of global rules are used in the processing units S1 of the packet processors 211-214, the interface 220 is configured to group the processing units S1 of the packet processors 211-214 into the second client group GROUP1; and a third set of global rules are used in the processing units S4 of the packet processors 211-214, the interface 220 is configured to group the processing units S4 of the packet processors 211-214 into a third client group GROUP4 for example. It is noted that the interface 220 can include other client groups that are not shown.

Further, the interface 220 is configured to allocate TCAM bank groups to client groups. In the FIG. 2 example, the interface 220 is configured to allocate TCAM bank groups 251, 252 and 256 to the first client group GROUP0, allocate TCAM bank group 255 to the second client group GROUP1, and allocate TCAM bank groups 253 and 254 to the third client group GROUP4. The TCAM memory space allocations for other client groups are not shown.

Figure 3:
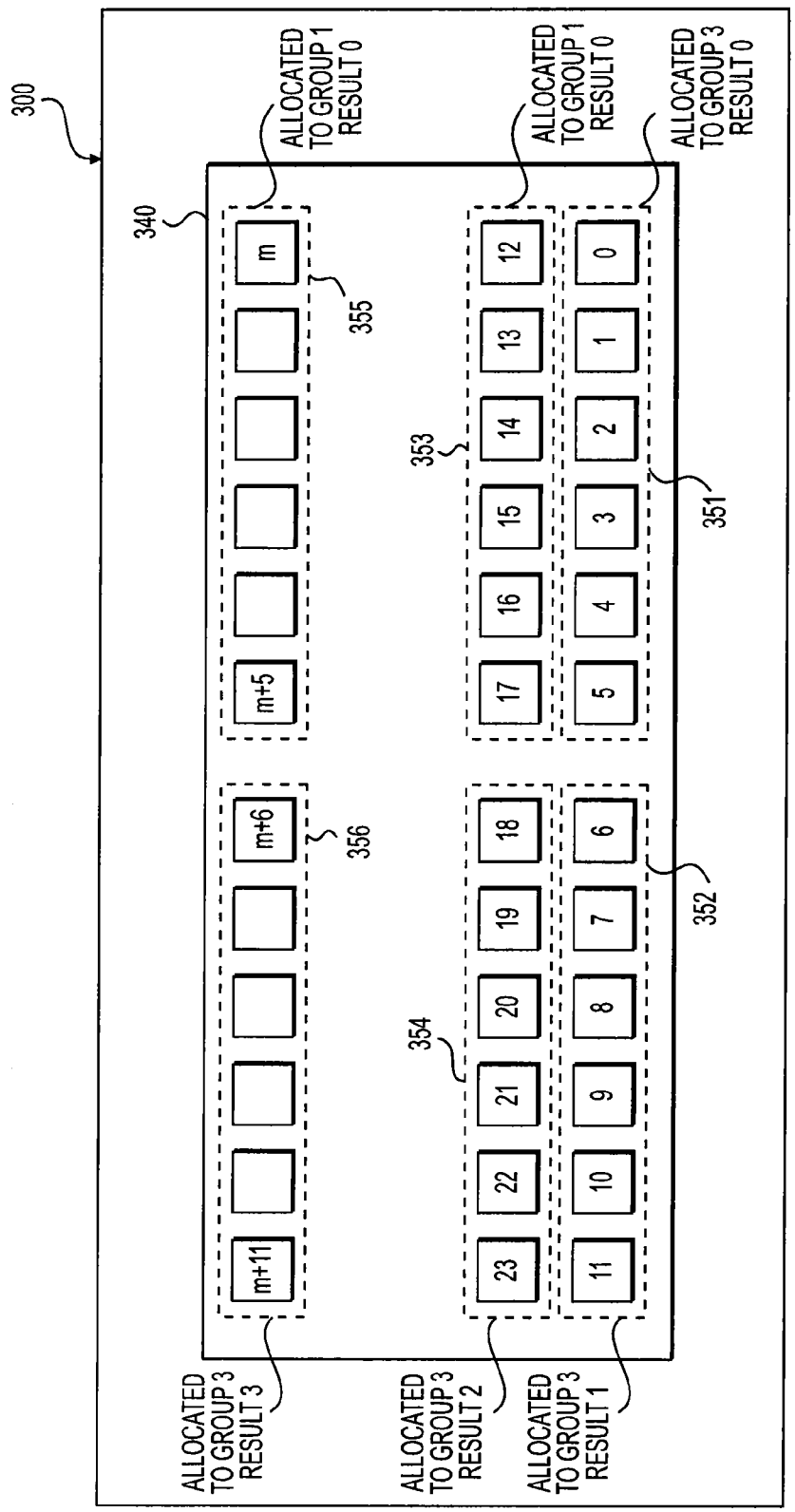
FIG. 3 shows a block diagram of an electronic device example 300 with a TCAM sharing configuration according to an embodiment of the disclosure.

FIG. 3 shows a block diagram of an electronic device 300 with a TCAM sharing configuration according to an embodiment of the disclosure. The electronic device 300 includes identical or equivalent components to those used in the electronic device 100; the description of these components has been provided above and will be omitted here for clarity purposes.

In the FIG. 3 example, the TCAM bank groups 351, 352, 354 and 356 are allocated to the same client group GROUP3 but different results, and the TCAM bank groups 353 and 355 are allocated to the client group GROUP1 and the same result. In an embodiment, search results respectively from the TCAM bank groups 351, 352, 354 and 356 are output without aggregation. Further, search results from the TCAM bank groups 353 and 355 are aggregated. For example, the one with the higher priority order is output as the aggregated search result.

Figure 4:
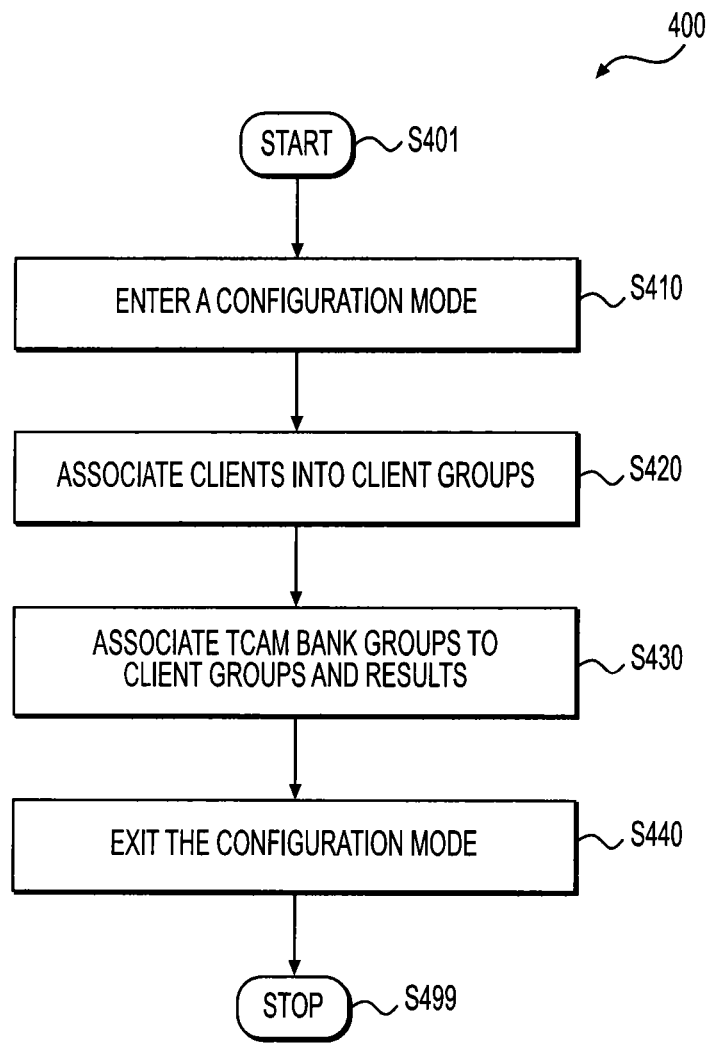
FIG. 4 shows a flow chart outlining a process example 400 according to an embodiment of the disclosure.

FIG. 4 shows a flow chart outlining a process example 400 according to an embodiment of the disclosure. In an example, the process 400 is executed by the electronic device 100. The process starts at S401 and proceeds to S410.

At S410, an electronic device, such as the electronic device 100, enters a configuration mode. In the FIG. 1 example, in the configuration mode, the interface 120 is configured to allocate TCAM banks 160 to the search clients 110. In an example, a CPU, such as an internal CPU of the electronic device 100 or an external CPU to the electronic device 100, executes software instructions to construct tables for configuring the interface 120, such as a first table to group search clients into client groups, a second table to associate TCAM bank groups to the client groups, a third table to associate TCAM bank groups to results, and the like. Then, the interface 120 is configured according to the tables.

At S420, search clients are associated into client groups based on search service requirements. In an example, by the first configuration 121, search clients who use the same global rules are associated into the same client group. In another example, a search client who uses different rules from other search clients is associated into a client group separate from the other search clients. In another example, an inactive search client is not associated into any client group.

At S430, TCAM bank groups are associated to the client groups and results. In an example, by the second configuration 123, TCAM bank groups are associated to the client groups. In an example, a TCAM bank group is associated to only one client group. Further, in an example, by the third configuration 125, the TCAM bank groups are associated to a same result or different results.

At S440, the electronic device exits the configuration mode, then the process proceeds to S499 and terminates.

It is noted that the electronic device has other suitable modes. In an example, after the interface configuration, the network device 100 enters a rule input mode, and respective rules for the different client groups are respectively stored in the allocated TCAM bank groups for the client groups. Then, the network device 100 enters a normal operation mode. In an example, in the normal operation mode, the network device 100 receives packets, the processing units in the packet processors 111-114 parse the packets and generate search keys, and the shared TCAM engine 140 performs search according to the configurations of the interface 120. Specifically, in an example, the search keys are provided to the TCAM engine 140 according to the first configuration 121 of client groups. The TCAM engine 140 performs a lookup for the client groups, and generates results according to the second configuration 123 (the bank group to client group association) and the third configuration 125 (the bank group to result association). The results direct to suitable actions to be applied to the received packets.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A packet processing system, comprising:
   a plurality of processing units configured to process packet data received from a computer network, and to perform an action on a received packet, the action being determined responsively to a lookup in a table of rules to determine a rule to be applied to the received packet;
   a ternary content addressable memory (TCAM) engine having a plurality of TCAM banks defining respective subsets of a TCAM memory space to store the rules; and
   an interface configured to selectively associate the TCAM banks on the fly to the processing units based on usage information of the processing units, the association being configurable to allocate the subsets of the TCAM memory space to groups of the processing units to share the TCAM memory space by the processing units, the interface further configured to associate two or more processing units having commonly applicable rules into a same processing group, and to allocate a subset of TCAM banks to the same processing group, the subset of TCAM banks performing lookup among the commonly applicable rules.

2. The packet processing system of claim 1, further comprising:
   a controller configured to receive indications of memory space requirements of the processing units and allocate the subsets of the TCAM memory to the groups of the processing units based on the indications.

3. The packet processing system of claim 1, wherein the interface is configured to associate another processing unit into another processing group, and allocate another subset of TCAM banks to the other processing group when the other processing unit applies different rules from the two or more processing units.

4. The packet processing system of claim 1, wherein entries of two or more TCAM banks are coupled to form a TCAM bank group based on a search key size requirement and the TCAM bank group is configured to output an index of a coupled entry when a search key matches the coupled entry.

5. The packet processing system of claim 4, wherein the interface is configured to associate one or more TCAM bank groups to a processing group of processing units based on a number of rule entries required by the processing group.

6. The packet processing system of claim 5, wherein the interface is configured to select an output from one of the TCAM bank groups based on a priority order of the TCAM bank groups when the TCAM bank groups are associated to a single result.

7. The packet processing system of claim 5, wherein the interface is configured to output respective outputs of the TCAM bank groups when the TCAM bank groups are associated to different results.

8. The packet processing system of claim 2, wherein the controller is configured to control the configurable interface associate the TCAM banks with active processing units in an application.

9. The packet processing system of claim 2, wherein the controller is configured to receive activity information of the processing units that are indicative of the memory space requirement, and control the interface to allocate the subsets of the memory space to the groups of the processing units according to the activity information.

10. A method for packet processing in a packet processing system that has a plurality of processing units, comprising:
parsing, by a processing unit, a received packet to generate a search key;
providing the search key to a ternary content addressable memory (TCAM) engine via an interface, wherein the TCAM engine includes a plurality of TCAM banks defining respective subsets of a TCAM memory space to store rules and the interface selectively associates the TCAM banks on the fly to the processing units based on usage information of the processing units, the association being configurable to allocate the subsets of the TCAM memory space to groups of the processing units to share the TCAM memory space by the processing units, the interface configured to associate two or more processing units having commonly applicable rules into a same processing group, and to allocate a subset of TCAM banks to the same processing group, the subset of TCAM banks performing lookup among the commonly applicable rules; and
performing an action on the received packet based on a search result from the TCAM engine.

11. The method of claim 10, further comprising:
receiving indications of memory space requirements of the processing units; and
allocating the subsets of the TCAM memory to the groups of the processing units based on the indications.

12. The method of claim 10, wherein the interface associates a single processing unit into a processing group, and allocates a subset of TCAM banks to the processing group when the processing unit applies different rules from other processing units.

13. The method of claim 10, further comprising:
searching coupled entries in a TCAM bank group in response to the search key, wherein the TRAM bank group is formed with entries of two or more TCAM banks being coupled; and
outputting an index of a coupled entry that matches the search key.

14. The method of claim 13, further comprising:
searching two or more TCAM bank groups that are associated to the processing unit.

15. The method of claim 14, further comprising:
selecting an output from one of the TCAM bank groups based on a priority order of the TCAM bank groups when the TCAM bank groups are associated to a single result.

16. The method of claim 14, further comprising:
outputting respective outputs of the TCAM bank groups when the TCAM bank groups are associated to different results.

17. The method of claim 11, further comprising:
associating the TCAM banks with active processing units in an application.

18. The method of claim 11, further comprising:
receiving activity information of the processing units that are indicative of the memory space requirement; and
allocating the subsets of the memory space to the groups of the processing units according to the activity information.

* * * * *